United States Patent
Ebihara et al.

(10) Patent No.: US 6,215,536 B1
(45) Date of Patent: Apr. 10, 2001

(54) REFLECTIVE LIQUID CRYSTAL DISPLAY DEVICE HAVING LIGHT SCATTERING LIQUID CRYSTAL DISPLAY ELEMENT, AND METHOD FOR MANUFACTURING REFLECTIVE LIQUID CRYSTAL DISPLAY DEVICE

(75) Inventors: Teruo Ebihara; Shunichi Motte; Kaori Takano; Shigeru Sembonmatsu; Hiroshi Sakuma; Takakazu Fukuchi; Osamu Yamazaki; Masafumi Hoshino; Naotoshi Shino; Shuhei Yamamoto, all of Chiba; Masanori Fujita, Narashino, all of (JP)

(73) Assignees: Seiko Instruments Inc.; Seiko Precision Inc., both of (JP)

( * ) Notice: Subject to any disclaimer, the term of this patent is extended or adjusted under 35 U.S.C. 154(b) by 0 days.

(21) Appl. No.: 09/227,051

(22) Filed: Jan. 7, 1999

(30) Foreign Application Priority Data

Jan. 8, 1998 (JP) ........................................ 10-2621

(51) Int. Cl.$^7$ .................................................. G02F 1/1333
(52) U.S. Cl. ................................ 349/86; 349/106; 349/93
(58) Field of Search ................................ 349/86, 92, 106

(56) References Cited

U.S. PATENT DOCUMENTS

| | | | |
|---|---|---|---|
| 5,469,278 | * 11/1995 | Takahara et al. | 349/86 |
| 5,686,978 | * 11/1997 | Oh | 349/93 |
| 5,734,454 | * 3/1998 | Omae et al. | 349/86 |
| 5,757,448 | * 5/1998 | Takei | 349/92 |
| 5,790,218 | * 8/1998 | Koden et al. | 349/92 |
| 6,014,194 | * 1/2000 | Kuo et al. | 349/88 |

* cited by examiner

Primary Examiner—Kenneth Parker
(74) Attorney, Agent, or Firm—Adams & Wilks

(57) ABSTRACT

A reflective liquid crystal display device comprises a transparent first substrate having formed thereon a transparent electrode, a first filter having a first color, and a second filte having a second color. A second substrate is disposed opposite and spaced-apart from the first substrate. A reflection layer is disposed on the second substrate. A polymer dispersed liquid crystal layer is disposed between the transparent electrode and the reflection layer and is formed by exposure to an ultraviolet ray in a preselected wavelength range. A ratio of a transmissivity of the first filter for the ultraviolet ray to a transmissivity of the second filter for the ultraviolet ray is 3.0 or less.

13 Claims, 4 Drawing Sheets

| FILTER COLOR | RED | GREEN | BLUE |
|---|---|---|---|
| FILM THICKNESS (APPROXIMATELY) | 3400 Å | 4100 Å | 2200 Å |
| TRANSMISSIVITY at 365 nm | 48 % | 20 % | 32 % |
| WHITY CLOUDINESS : T(0V) | 3.0 % | 5.3 % | 3.9 % |
| THRESHOLD VOLTAGE : Vth | 1.73 V | 1.53 V | 1.62 V |
| SATURATION VOLTAGE : Vsat | 2.68 V | 2.53 V | 2.60 V |
| HYSTERESIS : VH50 | 0.05 V | 0.05 V | 0.05 V |
| CURRENT-CONSUMPTION DURING Vsat : I | 0.44 μA | 0.45 μA | 0.44 μA |

Fig. 6

| FILTER COLOR | RED | GREEN | BLUE |
|---|---|---|---|
| FILM THICKNESS (APPROXIMATELY) | 3400 Å | 4100 Å | 2200 Å |
| TRANSMISSIVITY at 365 nm | 48 % | 20 % | 32 % |
| WHITY CLOUDINESS : T(0V) | 3.0 % | 5.3 % | 3.9 % |
| THRESHOLD VOLTAGE : Vth | 1.73 V | 1.53 V | 1.62 V |
| SATURATION VOLTAGE : Vsat | 2.68 V | 2.53 V | 2.60 V |
| HYSTERESIS : VH50 | 0.05 V | 0.05 V | 0.05 V |
| CURRENT-CONSUMPTION DURING Vsat : I | 0.44 μA | 0.45 μA | 0.44 μA |

REFLECTIVE LIQUID CRYSTAL DISPLAY DEVICE HAVING LIGHT SCATTERING LIQUID CRYSTAL DISPLAY ELEMENT, AND METHOD FOR MANUFACTURING REFLECTIVE LIQUID CRYSTAL DISPLAY DEVICE

BACKGROUND OF THE INVENTION

The present invention relates to a reflective color display device employing a light scatter liquid crystal display element and a method for manufacturing same, and more particularly to a reflective liquid crystal display device utilizing a polymer network liquid crystal containing a liquid crystal and polymer resin phase-separated through ultraviolet ray irradiation and a method for manufacturing same.

Liquid crystal display devices are broadly used as display panels for apparatuses used in various applications because of their many features, such as their thin size, low power consumption and so on. Recently reflective liquid crystal display devices without requiring a backlight-unit have been developed vigorously. Attention being drawn, among them, to a light-scatter mode reflective liquid crystal display device that provides bright display without requiring a polarization plate.

As a color means for such a light-scatter mode liquid crystal panel, there is a disclosure in Japanese Patent Laid-open No. H8-184815 having a structure formed by color filters arranged on an inner surface of an upper substrate at a front side of a polymer dispersed liquid crystal layer and a reflection layer having a mirror reflection characteristic arranged at a rear side of the polymer dispersed liquid crystal layer. Further, Japanese Patent Laid-open No. H7-152029 discloses a structure having color filters arranged at a front side of a polymer dispersed liquid crystal layer and an interference filter and a scatter reflection layer arranged at a rear side of the polymer dispersed liquid crystal layer.

However, there have been disadvantages in the color technologies for the conventional reflective polymer dispersed liquid crystal display devices, as follows.

Firstly, where pixel electrodes with mirror reflection characteristics are formed on a lower substrate and a color filter on an upper substrate, ultraviolet ray irradiation is carried out through the color filter. Accordingly, it is difficult for an ultraviolet ray to reach a liquid crystal/polymerizing compound and polymerization initiator filled between the two substrates, resulting in insufficient polymerization in the polymerizing compound and polymerization initiator. Due to this, there has been a problem that the liquid crystal is so low in light scattering property that practical quality in display is not available.

More specifically, in the case of a structure wherein each pixel is divided in three by RGB three-primary color filters, if an ultraviolet ray is irradiated through these color filters to cause phase-separation in the liquid crystal and polymer thereby forming a polymer dispersed liquid crystal layer, the polymer dispersed liquid crystal layer is greatly different in light scattering property between the respective colors due to a large difference in ultraviolet ray transmissivity for the respective color filters. For example, the pixel with good light scattering properties has brightness not varied by viewing directions. However, the pixel with poor light scattering properties has brightness that is extremely light in a positive reflecting direction and dark in directions other than that. Due to this, there has been a problem that color balance deviates depending upon a viewing direction resulting in poor quality in display. Meanwhile, if the ultraviolet ray transmissivity is matched to one another for the RGB color filters, there occurs color deviation in the visible light range thus resulting in degradation in color formation and hence poor quality in display. Therefore, it has been impossible to satisfy to match the ultraviolet ray transmissivity for the color filters and to maintain the color forming level for the color filters at the same time.

In order to solve such a problem, there is a proposal for a method that a color filter and a reflective layer having a mirror reflection characteristic are adjacently formed on the lower substrate at a side contacting with a liquid crystal. In this method, no filter is formed on the upper substrate so that the polymerizing compound and polymerization initiator can be polymerized homogeneously and fully through irradiating an ultraviolet ray from above the upper substrate. In this method, however, the color filter is present at a back of the polymer dispersed liquid crystal layer. Accordingly, there is increase in ratio of the light backwardly scattered by the polymer dispersed liquid crystal layer in front of the color filter to the incoming light, due to backward scattering by the polymer dispersed liquid crystal layer. Thus there has been a basic problem that the color to be displayed is lowered in color purity.

Secondly, Japanese Patent Laid-open No. H8-184815 discloses a structure and manufacture method of a reflective liquid crystal display device as a method to solve the above-stated problem. This disclosure example irradiates an ultraviolet ray from a side of the lower substrate on which no color filter is formed in order to phase-separate between the liquid crystal and the polymer. Thereafter, a reflection layer (mirror surface) is arranged on the ultraviolet-ray-irradiated lower substrate at a surface of the lower substrate not contacted with the liquid crystal. Accordingly, the ultraviolet ray can evenly and sufficiently reach the polymerizing compound and polymerization initiator, thus polymerizing the polymerizing compound and polymerization initiator to an even and sufficient extent. This provides phase separation that is homogeneous and favorable in state between the liquid crystal and the polymer for the color filters. As a result, the polymer dispersed liquid crystal layer obtained is homogeneous and stable in light scatteration and is favorable in color reproduction and contrast for the color filters. However, in this method there occurs a problem that is serious in display quality called "parallax" (or double image) because of the placement of the reflection layer (mirror surface) at an outside of the lower substrate. Here, the parallax refers to a phenomenon of double image that a shade (virtual image) is viewed overlapedly with an actual image. Where a glass exists between the color filter with polymer dispersed liquid crystal layer and the reflection layer (mirror surface), parallax (double image) occurs due to the presence of a distance (i.e., distance between the actual image and the virtual image due to the mirror surface) proportional to the thickness of the glass.

Thirdly, the polymer-dispersed mode liquid crystal display elements as light-scatter mode display elements include, as conventionally disclosed in Japanese Patent Laid-open No. H7-152029, a liquid crystal display element of a micro-capsuled structure having low molecular nematic liquid crystal involved in high molecular micro-capsules and a liquid crystal display element of a polymer matrix structure having low molecular nematic liquid crystal involved in a porous polymer matrix. In these polymer dispersed liquid crystal display elements in a structure having liquid crystal droplets within the polymer, liquid crystal molecules are placed along polymer walls of liquid crystal droplets. The liquid crystal molecules existing near the polymer walls suffer strong affection by the polymer walls. Due to this, the molecules, if applied by a voltage, will not be oriented in the electric field direction but is directed at a certain angle with respect thereto. Due to this, where the incoming light is oblique in direction, a difference occurs between the refractive index in an axial direction of the liquid crystal molecule and that of the polymer, leaving somewhat unavoidably light scatteration. Thus, there has been a problem that no favored transparent state is obtained even if a high voltage is applied. Also, if the cell gap is increased to enhance the light scatteration, light scatteration tends to occur for obliquely incoming light during application of voltage, resulting in whity cloudiness in display color with difficulty of vivid color representation and further decrease in contrast. Also, in the droplet-type polymer dispersed liquid crystal display element there is a method to decrease the cell gap in order to decrease drive voltage. However, if the cell gap is decreased to for example 10 μm or smaller, the light scatter state is worsened to an extent of not reaching a practical-use level. Accordingly, it has been difficult for the droplet-type polymer dispersed liquid crystal display element to obtain respective states of sufficient light scatteration and transparency with good contrast. Due to this, if the conventional droplet-type polymer dispersed liquid crystal display element with color filters and a reflection layer are combined to structure a reflective liquid crystal display device as in the Japanese Patent Laid-open No. H8-184815, there is insufficiency in either light scatteration or transparency thereby resulting in occurrence of variation in characteristics particularly due to a difference in filter colors. For example, where the light scattering is insufficient, the light scattering is worse in red as compared with blue thus resulting in worsened viewing-angle color balance. Meanwhile, where the transparency is insufficient, opaque in blue as compared with red thereby worsening viewing-angle black level. Thus there has been a difficulty in being mounted for practical application on a small-sized portable appliance with reduced voltage and power requirement.

Fourthly, in the case of an active matrix drive that active elements are arranged to drive display elements having pixels each divided in three by RGB three-primary color filters, if a polymer dispersed liquid crystal layer is formed by phase-separation between the liquid crystal and the polymer through irradiation an ultraviolet ray via the color filters that are different in ultraviolet ray transmissivity by the color, there results large variations in the voltage holding characteristic, bake characteristic, light resistance and so on for the polymer dispersed liquid crystal layer corresponding to the color filters. Specifically, there has been a problem that flicker or baking occurs in a particular color due to the variations in these characteristics.

SUMMARY OF THE INVENTION

Therefore, the present invention for a reflective liquid crystal display device has been made in order to solve the above problems, and it is an object of the invention to provide a reflective liquid crystal display device which is good in light scatter state by reducing variation in light scatteration caused by a polymer network liquid crystal layer corresponding to color filters divisionally constituting for each pixel, and a method for manufacturing same.

It is another object of the invention to provide a reflective liquid crystal display device which is driven by a greatly decreased voltage, free of parallax (double image), high in contrast and excellent in color reproducibility thereby offering for high display quality and reliability, and a method for manufacturing same.

It is still another object of the invention to provide a reflective liquid crystal display device which can be manufactured with low cost by utilizing a similar color filter manufacture method and facility to those of the conventional art, and a method for manufacturing same.

In order to achieve the above objects, a reflective liquid crystal display device according to the present invention comprises: a first transparent substrate formed with a transparent electrode and color filters; a second substrate provided opposite to the first transparent substrate and formed with a reflection layer and a voltage applying means; an active element formed on at least one of the first transparent substrate and the second substrate; a polymer dispersed liquid crystal layer provided between the first transparent substrate and the second substrate and modulatable by the active element; wherein the transparent electrode and the color filters are provided between the first transparent substrate and the polymer dispersed liquid crystal layer; the reflection layer and the voltage applying means being provided between the second substrate and the polymer dispersed liquid crystal layer; the polymer dispersed liquid crystal layer being a polymer network liquid crystal layer having a photo-set resin formed in a three dimensional mesh form in a continuous layer formed by a liquid crystal; the color filters being patterned at two or more areas on a same plane; and an ultraviolet ray transmissivity in a particular wavelength range required for forming the polymer network liquid crystal layer being three times or lower between the patterned color filters.

Further, the reflection layer may be a metal containing at least one of a metal, such as aluminum, silver, nickel, chromium, palladium and rhodium, an alloy thereof and an oxide thereof.

Also, the reflection layer may have a function as the voltage applying means.

Furthermore, a method for manufacturing a reflective liquid crystal display device according to the present invention comprises the steps of: a color filter forming process to form, on a first transparent substrate, color filters having a light separating characteristic to transmit an ultraviolet ray in a particular wavelength range required for setting a polymer dispersed liquid crystal and a light in a particular wavelength range of a visible portion of spectrum; a process to form a reflection layer and an active layer on a second substrate; a process to join between the first transparent substrate and the second substrate at a given gap through a sealing agent; a process to fill a mixture of a liquid crystal, a polymerizing compound and a polymerization initiator into the gap; and a ultraviolet irradiation process to irradiate a ultraviolet ray from a side of the first transparent substrate at a ultraviolet irradiation intensity that a light scatter state with a given transmissivity or lower is obtained for all pixels patterned, in order to polymerize and phase-separate the polymerizing compound and polymerization initiator into a liquid crystal and a polymer to form a polymer network liquid crystal layer.

In the ultraviolet irradiating process the mixture of the liquid crystal, the polymerizing compound and the polymerization initiator may be held in a temperature range 1 to 3° C. higher than a nematic isotropic phase shift temperature (NI point).

In the ultraviolet irradiating process ultraviolet irradiation may be performed by placing an ultraviolet shield layer to absorb or reflect a harmful ultraviolet ray to the liquid crystal at a front of the first transparent substrate.

In the color filter forming process the color filters may be adjusted relatively in film thickness, coloring material average particle size and coloring material concentration such that the color filters have a particular wavelength range ultraviolet ray transmissivity that is three times or lower than an intensity of ultraviolet irradiation performed in the ultraviolet irradiating process between the color filters.

In the color filter forming process a colored photosensitive resist is used, where dye or pigment in dispersion is in an average particle size of 0.09 μm or smaller.

BRIEF DESCRIPTION OF THE DRAWINGS

FIG. 6 is a table showing a measurement result on electro-optical characteristics.

DETAILED DESCRIPTION OF THE PREFERRED EMBODIMENTS

Now the present invention will be explained based on embodiments thereof.

A reflective color liquid crystal display device according to the present invention employs a polymer-network type polymer dispersed liquid crystal layer (PN-LC layer) for its polymer dispersed liquid crystal layer. The PN-LC layer is formed by irradiating a ultraviolet ray onto a mixture solution homogeneously dissolved with a liquid crystal, polymerizing compound and polymerization initiator so that the polymerizing compound and the polymerization initiator are polymerized to cause phase-separate between the liquid crystal and the resulting polymer.

The PN-LC layer has a characteristic which is greatly influenced upon by an ultraviolet ray irradiating condition (such as intensity, time period and temperature of the ultraviolet ray irradiation). In particular, the magnitude of ultraviolet ray irradiation intensity has a great effect upon a polymer network texture of the PN-LC layer. The distribution and average size of pores of the polymer network has a direct influence upon a light scattering degree Of the characteristics for the PN-LC layer, a characteristic of whity cloudiness has a direct bearing on a light scattering degree. The whity cloudiness refers to a light trasmissivity for a polymer dispersed liquid crystal layer in a state free from voltage application. The worsening of light scatteration means a worsening in whity cloudiness, and in other words an increase in optical transmissivity in a state free from voltage application.

Figure 3:
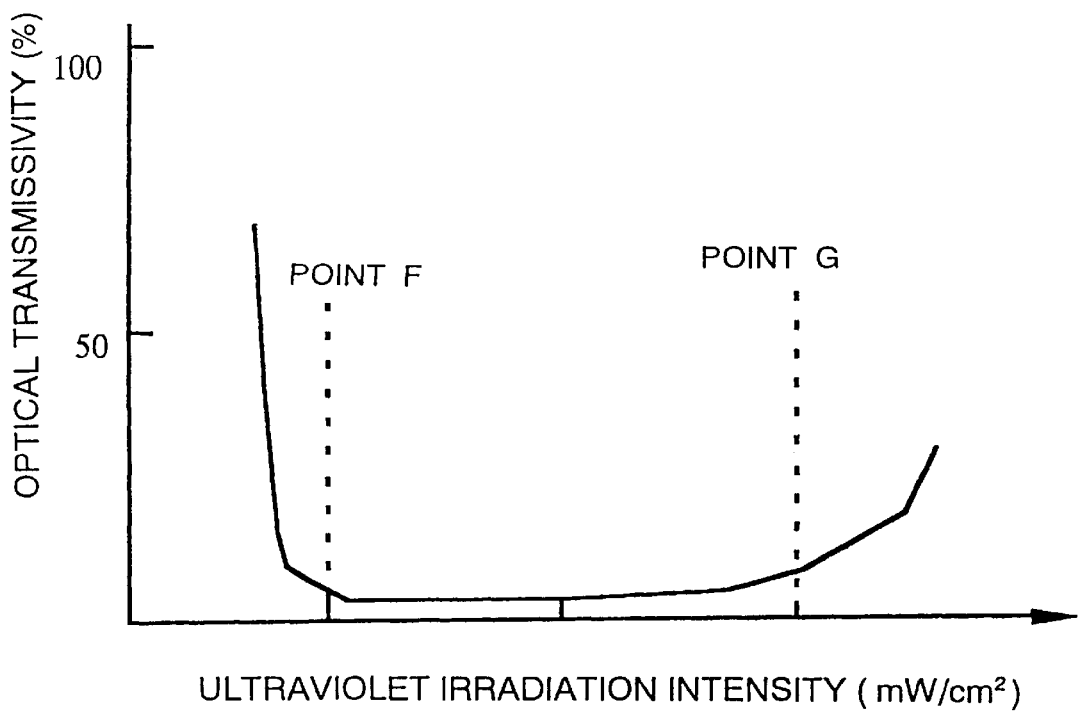
FIG. 3 is a graph showing a relationship between an intensity of an ultraviolet ray irradiation through a PN-LC layer and a light scatter degree (whity cloudiness)

FIG. 3 shows a graph demonstrating a relationship between a light scattering degree (whity cloudiness) and an irradiation intensity of a particular wavelength (365 nm in this case) ultraviolet ray for a PN-LC layer to be used in the present invention. As is clear from FIG. 3, the whity cloudiness worsens in an exponential function as the ultraviolet ray irradiation intensity weakens lower than that of a point F in the figure. The whity cloudiness also worsens if the irradiation intensity increases higher than that of a point G. It is noted that this relationship between the light scattering degree (whity cloudiness) and the irradiation intensity of an ultraviolet ray with a particular wavelength (365 nm in this case) is true also for a case where a ultraviolet ray is irradiated through a color filter with R, G, B, Y, M, C and the like to a mixture of a liquid crystal, polymerizing compound and polymerization initiator. That is, where a particular wavelength (e.g., 365 nm) ultraviolet ray is irradiated through a filter with different colors to a mixture of a liquid crystal, polymerizing compound and polymerization initiator, a same degree of a whity cloudiness can be obtained regardless of the colors of the filter by determining portions of the ultraviolet ray through the colors of the filter at a same intensity.

Also, the PN-LC layer has voltage characteristics (Vth, Vsat, sharpness, etc.) and response speeds that are strongly correlated with whity cloudiness (optical transmissivity with no voltage application). The response speed (particularly in fall) and the sharpness (γ=Vsat/Vth) tend to worsen in proportion to weakening in whity cloudiness. Also, if the whity cloudiness is weak, there are worsening in contrast ratio and increase in color variation by viewing angle. On the other hand, saturation voltage (Vsat) and threshold voltage (Vth) tend to lower in proportion to weakening in whity cloudiness. That is, they are placed in a direction of lowering voltage.

Figure 4:
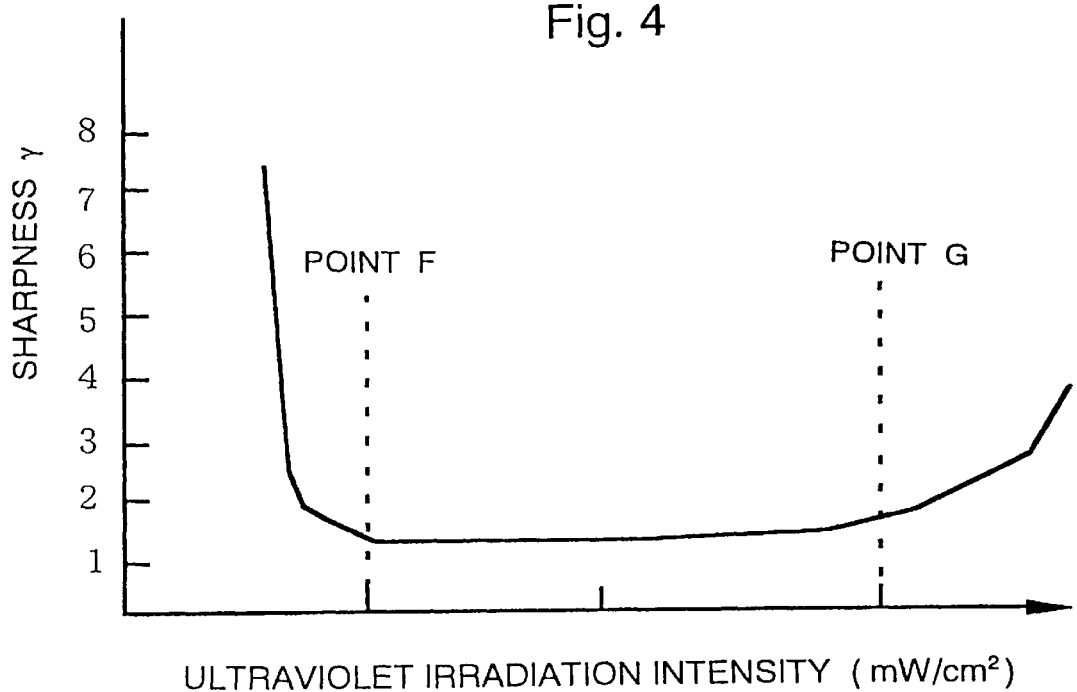
FIG. 4 is a graph showing a relationship between an intensity of an ultraviolet ray irradiation through a PN-LC layer and a sharpness (γ)

FIG. 4 shows a graph demonstrating a relationship between a ultraviolet ray irradiation intensity and a sharpness of a liquid crystal. As apparent from this figure, the sharpness worsens in an exponential function as the ultraviolet ray irradiation intensity weakens lower than that of a point F in the figure. The sharpness also worsens if the irradiation intensity increases higher than that of a point G.

Figure 5:
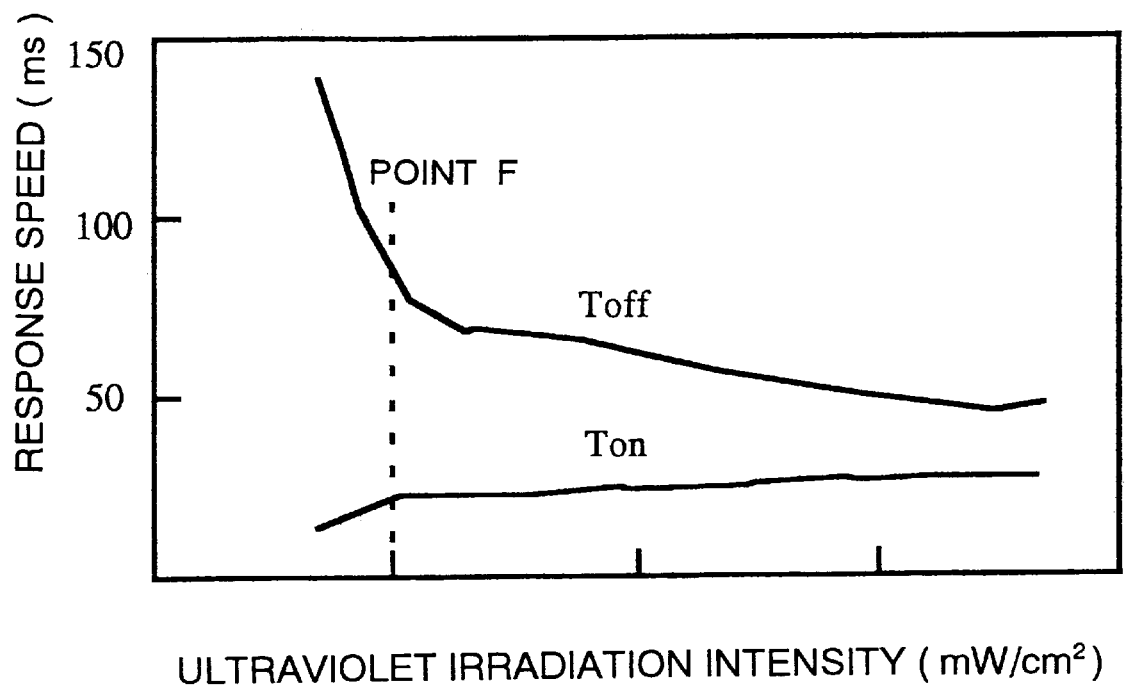
FIG. 5 is a graph showing a relationship between an intensity of an ultraviolet ray irradiation through a PN-LC layer and a response speed.

FIG. 5 is a graph representing a relationship between a ultraviolet ray irradiation intensity and a liquid crystal response speed. As clear from this figure, the response speed during fall (Toff) worsens in an exponential function as the ultraviolet ray irradiation intensity weakens lower that that of a point F in the figure.

Meanwhile, there arises a problem in reliability where forming a device under a condition that the ultraviolet ray irradiation intensity is higher than that of the point G. In particular, the resistance to light lowers to a significant extent. There is also lowering in voltage holdability and power consumption.

It is understood from this that there is necessity to determine the ultraviolet ray irradiation intensity at a value greater than that of the point F and smaller than that of the point G.

More specifically, it is important to put variation in transmissivity of ultraviolet rays through RGB portions of a color filter within a range of between the points F and G.

The present inventors has found that the problem as discussed above can be resolved by determining the ultraviolet ray transmissivity in a predetermined wavelength range of each color filter within three times or smaller between color filters and setting the intensity of the ultraviolet ray to fulfill the above range.

It has also been found as a means therefor that filters for each color can be formed by relatively adjusting the color filter film thickness, coloring material average particle size (0,09 μm or smaller) or color material concentration.

Now the present invention will be explained in detail on embodiments thereof.

(Embodiment 1)

Figure 1:
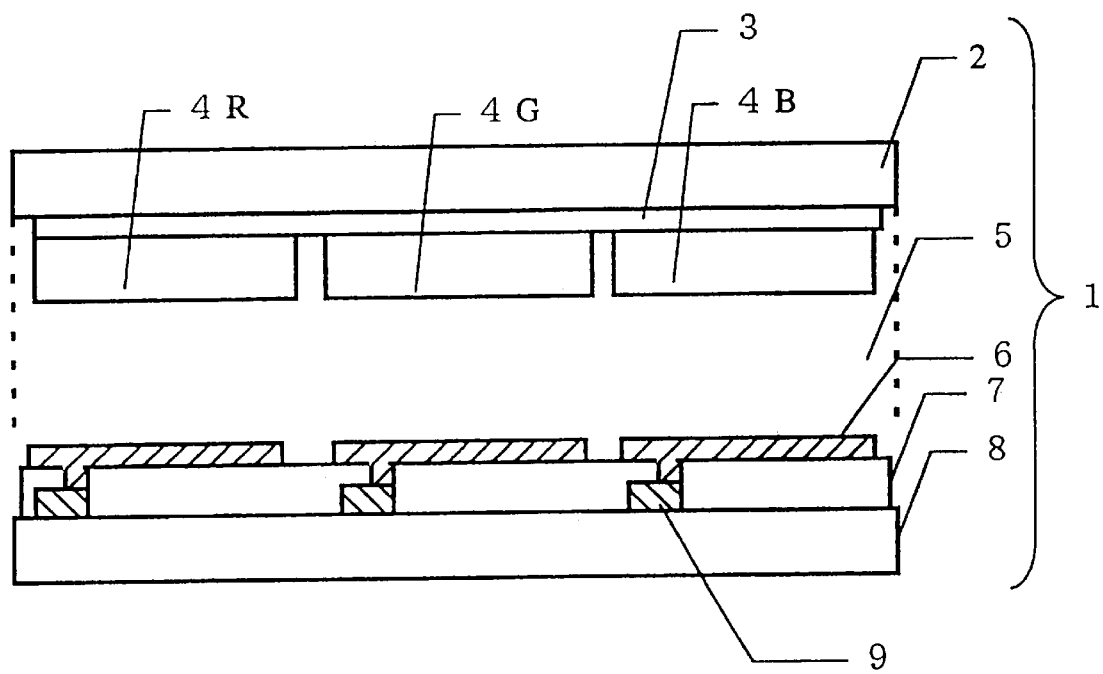
FIG. 1 is a sectional view showing a general structure of a reflective color liquid crystal display according to embodiment 1 of the present invention.

Referring to FIG. 1, there is illustrated a schematic structure of a reflective color liquid crystal display device according to the present embodiment.

In this embodiment a second substrate 8 has TFT elements 9 formed thereon as active element arrays.

A liquid crystal display device 1 includes a first substrate 2 having thereon transparent common electrodes 3, and an second substrate 8 having thereon TFT elements 9 formed under pixel electrodes 6 and an insulation film 7 wherein the pixel electrodes 6 are formed of aluminum as reflection layers that can cause mirror reflection as shown in FIG. 1. Further, a polymer network liquid crystal layer 5 is filled between the first substrate 2 and the second substrate 8. Red, green and blue three-primary color filters 4R, 4G, 4B are formed on the upper substrate on a surface of the substrate contacting with the polymer network liquid crystal layer 5. Incidentally, the respective substrates are held to give a cell gap of 10 $\mu$m.

In the present embodiment the first substrate 2 and the second substrate 8 used smooth, transparent glass plates. Note that transparent polymer films may be used in place of these smooth, transparent glass plates.

For the pixel electrodes 6, an aluminum thin film was formed by a sputter reactor while adjusting a film thickness to provide a mirror reflection characteristic. This thin film, in this embodiment, was formed in a film thickness of approximately 2000 angstroms by the sputter reactor. Here, the pixel electrodes 6 are not limited to aluminum but may use broadly a material provided that can be given a mirror reflecting characteristic through sputtering or deposition process. A metal such as silver or nickel, an alloy thereof, or an oxide thereof may be employed in place of aluminum.

Also, the pixel electrodes 6 may be formed by a combination of a metal thin film and a dielectric multi-layered thin film. In the case of forming the pixel electrodes 6 by only a metal thin film, there is slight absorption by a reflection layer. This absorption can be reduced by providing together a dielectric multi-layered thin film.

The polymer network liquid crystal layer is formed of a mixture solution dissolved homogeneously with a polymer resin such as an acrylate monomer capable of crosslinking and polymerization by ultraviolet ray(UV), an nematic liquid crystal having a positive dielectric anisotropy, a ultraviolet-ray setting initiator, and so on. This mixture solution is injected into an empty liquid crystal panel and exposed to an ultraviolet ray causing only the polymer resin to set so that the nematic liquid crystal with a positive dielectric anisotropy is phase-separated.

In the embodiment of the present invention, the polymer network liquid crystal layer is of a polymer network type having a texture formed by a liquid crystal continuous layer containing a photo-setting resin in a three-dimensional mesh texture, instead of a micro-capsuled nematic liquid crystal having a positive dielectric anisotropy or one dispersed with liquid crystal fine particle (liquid crystal droplets) throughout a liquid crystal matrix. This polymer network liquid crystal layer has a liquid crystal preferably in a ratio of 60 to 99% to a photo-setting resin, more preferably 75 to 95%. In order to realize a favorable light scatter state, the polymer network (three-dimensional mesh texture) favorably has a pore size distribution of nearly a visible light wavelength and less in variation, i.e., an even pore size. The polymer network (three-dimensional mesh texture) preferably has an average pore size of 0.4 $\mu$m to 2.5 $\mu$m. More preferably, the polymer network has an average pore size of 0.4 $\mu$m to 1.8 $\mu$m. The average pore size, when given in this range, can realize a light scatter state most preferred(whity cloudiness). Incidentally, where the polymer network is out of a range of 0.4 $\mu$m to 3.5 $\mu$m, the light scatter state is worsened and the contrast is lowered.

Also, the reduction in voltage and hysteresis can be realized more easily by the structure with a polymer network (three-dimensional mesh texture) having a liquid crystal continuous phase than a structure having independent liquid crystal fine particulate matters (liquid crystal droplets). Accordingly, the ratio of the liquid crystal to the photo-setting resin is further preferably in a range of 75 to 99%. Due to this, a scatter-mode polymer dispersed liquid crystal layer with greatly reduced voltage requirement and decreased hysteresis can be realized, which is by far superior in light scatter characteristic to a structure having a micro-capsuled nematic liquid crystal or a polymer dispersed liquid crystal layer having liquid crystal fine particulate matters throughout a resin matrix.

In the present embodiment "PNM-156" by Lodic Company was used as a mixture solution having a polymer network type liquid crystal/polymerizing compound and a polymerization initiator.

Red, green and blue three-primary color filter 3 was formed by a pigment dispersion technique through photo-lithographically patterning red, green and blue colors corresponding 1:1 to pixel electrodes therefor. In the pigment dispersion technique, a color filter is formed by photolithographically patterning a colored photo-sensitive resist previously dispersed with a pigment dye and photo-sensitive resin into a desired pixel pattern. Usually, a light shield film pattern is formed by a metal film such as of chromium and thereafter a photolithographic process is repeated three times to form red, green and blue three-primary color filters. Accordingly a color filter, if including light shield film formation, is completed by repeating the photolithographic process four times.

The quality in fining and dispersing the pigment has a great effect upon the transparency and color purity of a color filter. In order to realize a color filter possessing a favorable transparency and color purity, the colored photo-resist was adjusted so that the average particle size of the pigment in dispersion is 0.1 $\mu$m or smaller.

Incidentally, the color filter of the present embodiment may be formed by a dyeing method using a dye in order to make a color filter high in transparency and excellent in color purity.

The factors that determine a hue such as an average optical transmissivity (brightness) and chromaticness for a color filter involve the dispersibility and film thickness of a pigment. In a pigment dispersion method, if a pigment is determined, a hue (such as an average optical transparency or chromaticness) is nearly determined from a coat thickness of a colored photosensitive resist. That is, the average optical transparency (brightness) of a color filter can be increased by decreasing the film thickness of the color filter, which reduces optical loss and improves brightness in display. On the contrary, color reproducibility is lowered, It is therefore important to achieve an optimization for a film thickness, in other words an average optical transparency (brightness), of a color filter.

In the present embodiment, CR7001-12CP, CG7001-12 CP and CB7001-12CP by Fuji Film Ohrin Company were used as colored photo-sensitive resists for three red, green and blue colors. Red, green and blue three-primary color filters were set of their thickness as shown in table. 1, by collectively examining for color balance, brightness in display, color purity and so on. That is, the film thickness was set as red=approximately 3400 angstroms, green= approximately 4100 angstroms and blue=2200 angstroms. Red, green and blue three-primary color filters were formed, by the pigment dispersion method, on a surface of the first substrate 2 to be contacted with a polymer network liquid crystal layer. The color filters were formed in the order of green, red, and blue. The color filters having these thickness values have an optical transmissivity for a particular wavelength (365 nm) of red=48%, green=20% and blue= approximately 32%. The red, green and blue three-primary color filters 3 are structured overlapping one another by a predetermined width (approximately 4 μm in this embodiment) in order to prevent light leakage.

An empty liquid crystal display device fabricated as the above, i.e., an empty liquid crystal display device oppositely placed at a given gap with the first substrate 2 having the red, green and blue three-primary color filters formed on an inner surface thereof and the second substrate 8 having the silver mirror pixel electrodes 6 formed on an inner surface thereof, is vacuum-filled by "PNM-156" by Lodic company (phase shift temperature: NI point=24.1° C.) as a mixture solution of a polymer network type liquid crystal/polymerizing compound and polymerization initiator while keeping a temperature of 30° C. for holding an isotropic state. This is irradiated by a 200 mW/cm² ultraviolet ray (365 nm), using a metal halide lamp, through the color filters for 60 seconds while being held at a temperature of 25.5° C. higher by 1.4° C. than the NI point. The liquid crystal and the polymer are phase-separated to thereby fabricating a display device 1 with a polymer network liquid crystal.

Figure 2:
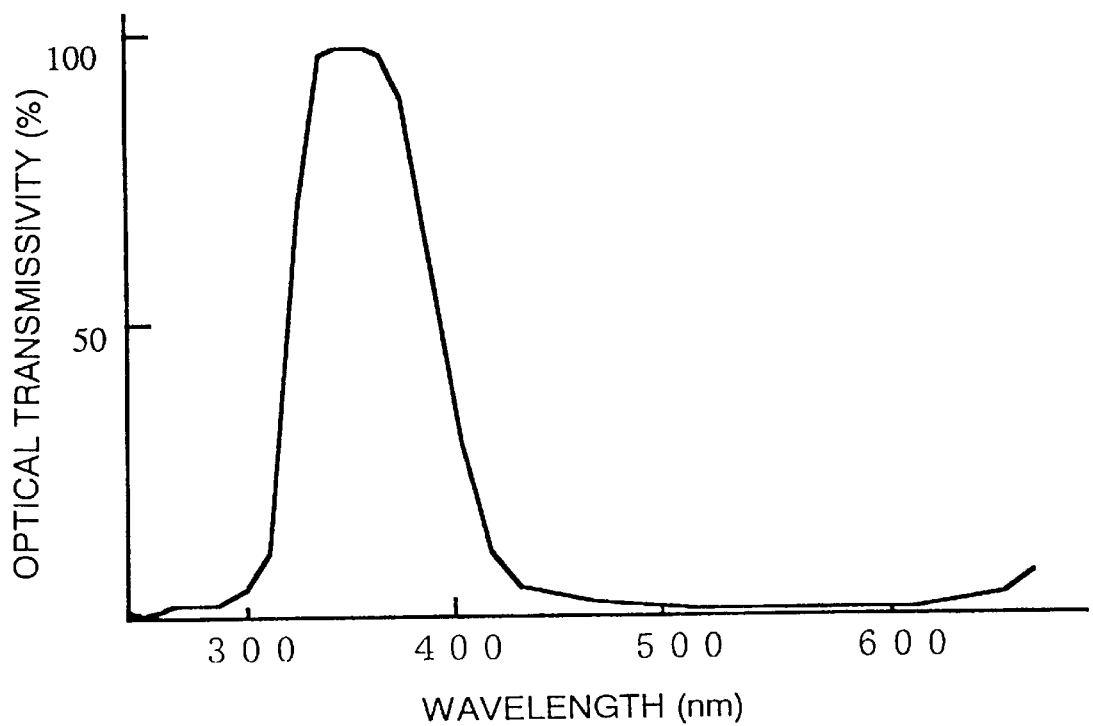
FIG. 2 is a light separating characteristic of an ultraviolet ray absorbing filter used for ultraviolet irradiation in the present invention.

The intensity of ultraviolet ray (365 nm) irradiation, when the variation in optical transmissivity of the color filter for a particular wavelength (365 nm) is less than three times, was set at a point F in FIG. 3 under a condition for the lowest optical transmissivity. At this time, the ultraviolet ray is irradiated with using a filter that can absorb a ultraviolet ray with a wavelength of 350 nm or shorter as shown in FIG. 2. The ultraviolet ray with a wavelength of 350 nm or shorter gives damage to the resin or liquid crystal molecules constituting for the polymer network. Therefore, if the ultraviolet ray is irradiated by using a filter as shown in FIG. 2, the display device can be prevented from degrading in quality.

In the meanwhile, the polymer network texture (polymer network average pore size, pore distribution and the like) has a great effect upon the intensity of ultraviolet ray irradiation. Accordingly, it is of great importance to use an ultraviolet ray irradiation method that can instantaneously start to irradiate at a predetermined ultraviolet ray intensity (200 mW/cm² in the present embodiment) using a shutter, in order to provide a polymer network with an average pore size of approximately 1 μm and very sharp pore distribution.

Furthermore, the temperature upon vacuum filling and ultraviolet ray irradiation must be higher than the phase shift temperature (point NI=24.1° C. in this embodiment) of a liquid crystal material. In particular, it is extremely important to set the temperature during ultraviolet ray irradiation to polymerize the polymerizing compound and polymerization initiator in a temperature range higher by 1 to 3° C. than the phase shift temperature. In the present embodiment setting was made 1.5° C. higher than the phase shift temperature. The setting in the temperature range higher by 1 to 3° C. than the phase shift temperature can suppress the variation in properties, such as whity cloudiness, sharpness and response speed, of the polymer network liquid crystal layer 5 corresponding to each color filter, thus realizing stable quality of display.

A polymer network type color liquid crystal display device 1 fabricated in this manner was observed of a polymer network liquid crystal layers 5 corresponding to the red, green and blue color filters, by using a scanning electronic microscope. As a result, a polymer three-dimensional mesh texture (polymer network texture) was confirmed. This three-dimensional mesh texture had an average pore size of approximately 1.0 μm. Using a Canon-made photometer, the polymer network liquid crystal layers 5 were measured as to electro-optic characteristics correspondingly to the red, green and blue color filters 4R, 4G, 4B. The result of this measurements is shown in FIG. 6.

Here, whity cloudiness means an optical transmissivity during no voltage application: T (0 V). Saturation voltage (Vsat) means an application voltage at which the optical transmissivity exhibits 90% when the optical transmissivity is saturated (100% optical transmissivity) by increase in the application voltage. Threshold voltage (Vth) means an application voltage at which the optical transmissivity exhibits 10%. VH50 is a hysteresis characteristic at an optical transmissivity of 50%. VH 50 is defined by the following equation.

$$VH50 = VUP50 - VDW50$$

Incidentally, VUP50 is an application voltage at which the optical transmissivity exhibited 50% during increasing the application voltage. VDW50 is an application voltage at which the optical transmissivity exhibited 50% during decreasing the application voltage.

It was confirmed from the measurement result that the polymer network liquid crystal layers 5 corresponding to the red, green and blue color filters of the polymer network type color liquid crystal display device 1 fabricated in the present embodiment are respectively scatter-mode polymer dispersed liquid crystal layers that are good in light scatter characteristic, greatly reduced in voltage requirement and low in hysteresis characteristic.

Further, because the color filters and pixel electrodes are formed at the inner surface of the color liquid crystal display device 1, there is no occurrence of parallax (double images) and accompanying problems of decrease in brightness due to parallax and worsening in color purity.

Accordingly, bright, clear high-visibility display was obtained. It was also confirmed that the quality in color display is good in contrast, vivid in color reproduction and good in color balance. Incidentally, this reflective color liquid crystal display device exhibits a color given by the color filters when no voltage is applied, and black when voltage is applied. The contrast is 1:6. The color purity is (x, y)=(0.47, 0.33) in red, (x, y)=(0.30, 0.47) in green and (x, y)=(0.21, 0.23) in blue.

Next, a reflective color liquid crystal display device was fabricated in a similar method to the above by utilizing yellow (Y), magenta (M) and cyan (C) three-primary color filters 3.

Incidentally, CY7001-12CP, CM7001-12 CP and CC7001-12CP by Fuji-Film-Ohrin Company were used as colored photo-sensitive resists for three yellow (Y), magenta (M) and cyan (C). Incidentally, the film thickness for each color filter 3 was set as yellow=approximately 3900 angstroms, magenta=approximately 3400 angstroms and cyan=2800 angstroms.

It was confirmed that the polymer network liquid crystal layers corresponding to the YMC color filters 4 of this liquid crystal display device 1 are respectively scatter-mode polymer dispersed liquid crystal layers that are good in light scatter characteristic, greatly reduced in voltage requirement and low in hysteresis characteristic.

Further, because the color filter and reflection layer are formed on an inner surface of the liquid crystal display device 1, there is no occurrence of parallax (double images) and accompanying problems of decrease in brightness due to parallax and worsening in color purity. Accordingly, bright, clear high-visibility display was obtained. It was also confirmed that the quality in color display is good in contrast, vivid in color reproduction and good in color balance.

Incidentally, the reflective color liquid crystal display device with the YMC three-primary color filter realized display with generally higher brightness than that of the reflective color liquid crystal display device with the RGB three-primary color filter. However, there exhibited somewhat inferiority in color purity. Therefore, there may be a case that the reflective color liquid crystal display device with the YMC three-primary color filter is more suitable than the reflective color liquid crystal display device with the RGB three-primary color filter, as the application may be.

EXAMPLE 2

An embodiment of a reflective color liquid crystal display device is described below, which has pixels each formed by red, green, blue and transparent four color filters.

This device was fabricated in a similar structure to Example 1 except that each of the pixels was formed by red, green, blue and transparent four color filters. The cell gap was 10 $\mu$m. Each of these four colors (red, green, blue and transparent) has a ultraviolet ray transmissivity of less than three times in a process of irradiating a ultraviolet ray to a mixture solution layer of a liquid crystal/polymerizing compound and polymerization initiator. Accordingly, it is possible to reduce variation in properties, such as whity cloudiness, sharpness and response speed, of the polymer network liquid crystal layers 5 corresponding to the color filters, thus realizing stable quality in display.

Each pixel is formed by divisional four color filters (four color areas) of red R1, green G1, blue B1 and transparent W1. Accordingly, R1, G1, B1 and W1 are respectively controlled on voltage application to exhibit their colors. On each pixel of the liquid crystal display device 1, halftone or intermediate color hue can be made more effectively by combinations of voltage application control for the four colors than in the conventional R, G and B three-color filters. The R1, G1 and B1 three-color filters are formed on an upper substrate such that they have substantially the same area (average area), i.e., an area ratio of 1:1:1. For example, the color filters R1, G1 and B1 are formed in a rectangular form of 100 $\mu$m×350 $\mu$m. On the other hand, the W1 (transparent) color filter is determined of its area in consideration of increase in brightness and converse reduction in color purity and visibility for human eyes due to provision of W1 (transparent). This is preferably formed in smaller area than the other three colors (R1, G1, B1). In the present embodiment, it was formed in a rectangular form of 50 $\mu$m×200 $\mu$m. That is, W1 (transparent) was half in area of each of other three colors (R1, G1, B1).

The reflective color liquid crystal display device having red, green, blue and transparent four-color filters, as fabricated in the present embodiment, could exhibit display with brightness higher than Embodiment 1. Incidentally, although the color purity was somewhat decreased, color reproduction was well applicable for practical use.

Incidentally, the color filters may be structured in a basic unit of combining red, green and blue three colors such that at least one color contains a transparent portion in a same area. One pixel is structured by three color filters of red R1, green G1 and blue B1 to have three color areas. By providing a transparent portion in part of a color filter of red R1, green G1 or blue B1, brighter display is obtained without increasing the number of divided pixel electrodes. Although the color purity was somewhat low, color reproduction was achieved that is fully applicable for practical use.

As explained above, the reflective color liquid crystal display device according to the present invention has pixels each divided by color filters of a plurality of colors to provide color display, wherein each color filter has a function to pass a predetermined wavelength of a ultraviolet ray and the transmissivity of the ultraviolet ray is limited to within three times or smaller between the color filters. Accordingly, if a ultraviolet ray with a particular wavelength is irradiated through the color filters, it is possible to suppress variations in basic properties, such as whity cloudiness, sharpness and response speed, low of the polymer network liquid crystal layer corresponding to in-pixel color filters. This provides a reflective color liquid crystal display device which is superior in color reproducibility depending on viewing angle to that of the conventional and further high in display quality and response speed.

Also, the use of the polymer network liquid crystal layer realizes both good light scatteration (whity cloudiness) and greatly-voltage-reduced drive. This enabled a battery of a portable information apparatus to have a longer life than before and the apparatus was made possible to be provided as a bright reflective color liquid crystal display device.

Further, because the color filters and the reflection layer are arranged on the inner surface of the liquid crystal display device, it becomes possible to provide a reflective color liquid crystal display device that is free from the double image problem and hence good in color reproducibility.

Further, the color filters used in the invention can be formed by a generally-available color filter forming technique, such as a pigment dispersion method or dyeing method. Accordingly, the method and facility for forming the color filters may be similar to those of the conventional, at providing color filters at reduced cost.

In addition, by using TFT elements as active elements, it is possible to provide a reflective color liquid crystal display device with display qualities, i.e., bright, excellent in color reproducibility, good in contrast and light resistance, and free of flicker and burning.

What is claimed is:

1. A reflective liquid crystal display device comprising: a transparent first substrate having disposed thereon a transparent electrode, a first filter having a first color, and a second filter having a second color; a second substrate disposed opposite and spaced-apart from the first substrate; a reflection layer disposed on the second substrate; and a polymer dispersed liquid crystal layer disposed between the transparent electrode and the reflection layer and formed by exposure to an ultraviolet ray in a preselected wavelength range; wherein a ratio of a transmissivity of the first filter for the ultraviolet ray to a transmissivity of the second filter for the ultraviolet ray is 3.0 or less.

2. A reflective liquid crystal display device according to claim 1; further comprising voltage application means for applying a voltage to the transparent electrode.

3. A reflective liquid crystal display device according to claim 2; wherein the voltage application means comprises the reflection layer.

4. A reflective liquid crystal display device according to claim 1; wherein the transparent electrode, the first filter and the second filter are disposed between the first substrate and the polymer dispersed liquid crystal layer.

5. A reflective liquid crystal display device according to claim 1; wherein the polymer dispersed liquid crystal layer comprises a polymer network liquid crystal layer having a photo-set resin comprised of a continuous liquid crystal layer having a three dimensional mesh form.

6. A reflective liquid crystal display device according to claim 1; wherein the reflection layer comprises at least one metal selected from the group consisting of aluminum, silver, nickel, chromium, palladium and rhodium.

7. A reflective liquid crystal display device according to claim 1; wherein the reflection layer is disposed between the second substrate and the polymer dispersed liquid crystal layer.

8. A method for manufacturing a reflective liquid crystal display device, comprising the steps of: forming a first filter having a first color and a second filter having a second color on a transparent first substrate, the first and second filters having spectral characteristics such that the first and second filters transmit visible light in a preselected wavelength range and transmit an ultraviolet ray in a preselected wavelength range and such that a ratio of a transmissivity of the first filter for the ultraviolet ray to a transmissivity of the second filter for the ultraviolet ray is 3.0 or less; forming a reflection layer on a second substrate; connecting the first substrate and the second substrate together in spaced-apart relation to form a space therebetween; disposing a mixture of a liquid crystal, a polymerizing compound and a polymerization initiator into the space between the first and second substrates; and irradiating the mixture with an ultraviolet ray in the preselected wavelength range to form a polymer network liquid crystal layer.

9. A method according to claim 8; wherein the connecting step comprises connecting the first substrate and the second substrate together using a sealing agent.

10. A method according to claim 9; wherein the irradiating step comprises irradiating the mixture with an ultraviolet ray in the preselected wavelength range from a side of the transparent first substrate.

11. A method according to claim 8; wherein the irradiating step comprises irradiating the mixture with an ultraviolet ray in the preselected wavelength range from a side of the transparent first substrate.

12. A reflective liquid crystal display device comprising: a transparent first substrate having a transparent electrode and a plurality of filters, each of the filters having a different color and a transmissivity for ultraviolet light in a preselected wavelength region; a second substrate disposed opposite and spaced-apart from the first substrate; a reflection layer disposed on the second substrate; and a polymer dispersed liquid crystal layer disposed between the transparent electrode and the reflection layer.

13. A reflective liquid crystal display device according to claim 12; wherein a ratio of the transmissivity for ultraviolet light of one of the filters to the transmissivity for ultraviolet light of another one of the filters is 3.0 or less.

* * * * *